US 6,558,536 B2

(12) United States Patent
Jainek et al.

(10) Patent No.: US 6,558,536 B2
(45) Date of Patent: May 6, 2003

(54) LIQUID FILTER WITH A COOLER

(75) Inventors: Herbert Jainek, Heilbronn (DE); Martin Weindorf, Kornwestheim (DE); Herbert Dreher, Horb (DE)

(73) Assignee: Filterwerk Mann & Hummel GmbH, Ludwigsburg (GB)

( * ) Notice: Subject to any disclaimer, the term of this patent is extended or adjusted under 35 U.S.C. 154(b) by 27 days.

(21) Appl. No.: 09/741,097

(22) Filed: Dec. 21, 2000

(65) Prior Publication Data

US 2001/0025812 A1 Oct. 4, 2001

(30) Foreign Application Priority Data

Dec. 21, 1999 (DE) .......................... 199 61 579

(51) Int. Cl.⁷ ..................... B01D 27/07; B01D 35/18
(52) U.S. Cl. ................ 210/184; 210/232; 210/440; 210/443; 210/429; 210/453; 210/455; 210/457; 165/119
(58) Field of Search ................ 210/440, 457, 210/184, 248, 428–430, 450, 451, 453, 455, 111, 130–131, 117, 132–133, 443–444, 232; 123/196 A, 196 AB; 165/119

(56) References Cited

U.S. PATENT DOCUMENTS

| 4,580,625 A | * | 4/1986 | Yamanaka et al. |
| 4,638,856 A | * | 1/1987 | Yamanaka et al. |
| 4,831,980 A | * | 5/1989 | Nasu et al. |
| 5,014,775 A | * | 5/1991 | Watanabe |
| 6,101,996 A | * | 8/2000 | Arita et al. |
| 6,422,305 B2 | * | 7/2002 | Jainek |

FOREIGN PATENT DOCUMENTS

| DE | 612549 | * | 8/1994 |
| EP | 0 612 549 | | 8/1994 |
| JP | 10-235110 | * | 9/1998 |

OTHER PUBLICATIONS

Patent Abstract of JP 10–235110 (machine translations of abstract, drawing descriptions, claims and detailed description of the patent JP10–235110).*

* cited by examiner

Primary Examiner—W. L. Walker
Assistant Examiner—Marianne Ocampo
(74) Attorney, Agent, or Firm—Crowell & Moring LLP

(57) ABSTRACT

A liquid filter, especially including an oil filter cartridge (12) which is contained in a pot-shaped or cylindrical housing (10) with threaded cover (11), into which a cooler (13) is preferably installed. An outlet opening (37a) is contained in the oil cooler (13) which facilitates complete emptying of the cooler when the filter is changed. In this way, a complete replacement of the oil can be performed, so that the replaced oil is not contaminated from the outset by residues of the old oil. Thus, service intervals can be lengthened. To prevent a short circuit of the outlet opening (37a) during operation, the opening is closed by a valve stem (33) coupled to the threaded cover (11) and opened by unscrewing the cover.

8 Claims, 2 Drawing Sheets

LIQUID FILTER WITH A COOLER

BACKGROUND OF THE INVENTION

The invention relates to a liquid filter which is combined with a cooler for the liquid being filtered, and which contains a valve stem with a gasket for closing openings which are intended to facilitate draining the filter housing during an oil change. The invention furthermore relates to a cooler which is suitable for installation in this filter-cooler combination.

A filter with valve stem for closing a drain opening is disclosed, for example, in EP 612 549 B1. If one consults FIG. 2, for example, of this document, the principle of the operation of the valve stem will be apparent from the example of its installation. A filter element 16 is installed upright in a pot-like or cylindrical housing 1. The cylindrical housing is closed by a screw cover 2, a valve stem 3 being integrated into the cover and sealing at its end an opening for draining any oil remaining in the filter when the filter cartridge is removed. This opening is released whenever the screw cover 2 is opened, since the valve stem is positively guided axially by the screw cover 2. In this manner a thorough draining of the filter housing can be achieved, and lubricating oil is prevented from passing into the environment when the filter is changed. Also, the total draining permits a complete oil change, which is advantageous since residues would bring contaminants into the fresh oil from the outset.

If a filter system of the kind described is combined with a cooler for the liquid being filtered, it is desirable also to drain the oil cooler. Unlike the filter element, however, the oil cooler has a complex geometry, so that a certain amount of residual oil always remains therein. It cannot in this case be removed by using the valve stem to uncover a drain hole in the bottom of the housing, because residual oil will still remain in the cooler element itself.

SUMMARY OF THE INVENTION

It is the object of the present invention to provide an improved liquid filter with a cooler.

It is also an object of the invention to provide a liquid filter with a cooler which assures a thorough drainage of the old oil before an oil change.

Yet another object of the invention is to provide an improved cooler for use with a liquid filter.

These and other objects are achieved in accordance with the present invention by providing a liquid filter comprising a cylindrical housing having an upwardly oriented opening, relative to gravity, and a threaded cover screwed onto the housing to close the opening, the housing having a filter inlet and a filter outlet for a liquid to be filtered, a filter cartridge sealingly disposed in the housing between the inlet and outlet so that liquid from the inlet must pass through the filter cartridge to reach the filter outlet, a cooler disposed underneath the filter cartridge in the housing such that liquid which has passed through the filter cartridge can flow through the cooler to the filter outlet, the cooler having an outlet opening, a valve stem extending along the axis of rotation of the threaded cover, the valve stem having a range of axial play relative to the threaded cover which is limited by the threaded cover, and at least one seal on the valve stem which seals the cooler outlet opening, the outlet opening being opened by unscrewing the threaded cover from the housing.

In accordance with a further aspect of the invention, the objects are achieved by providing a cooler for installation in a liquid filter as describe above in which the cooler has a drain outlet opening which is closed when the cooler is installed in the liquid filter and the threaded cover is screwed onto the filter housing.

The liquid container according to the invention has a pot-like or cylindrical housing whose opening points upward with respect to the force of gravity. The cylinder does not need to be oriented precisely vertical; instead it may be inclined at an angle to the vertical. A filter cartridge is installed in the cylindrical housing through which the liquid to be filtered can flow from a filter inlet to a filter outlet. A cooler is disposed beneath the filter cartridge. It has an entry for the filtered liquid, which communicates with the clean side of the filter cartridge. This can be achieved by also installing the cooler in the cylindrical housing of the filter and having it communicate through gaskets with the appropriate connections. Another possibility is to arrange the cooler under the filter housing, in which case the housing as well as the cooler must have connections communicating one with the other. These connections must assure the circulation of the liquid through the filter cartridge and cooler, and provide for the circulation of a coolant in the cooler. In both situations, however, the cooler has a drain opening which is closed by a gasket. This gasket is applied to a valve stem, which is connected to the screw cap of the housing such that its axial play is limited by this connection. A defined axial play can be provided, which also includes the case where the axial free play equals zero. To attach the valve stem to the screw cover, a catch or snap fastener, for example, can be provided, which permits a certain axial free play. Another possibility is to attach the valve stem permanently to the screw cover, for example by adhesively bonding the valve stem to the cover, or even to manufacture the valve stem in one piece with the screw cover.

In any case, the result of the axial fastening of the valve stem to the screw cover is that, when the cover is unscrewed, the gasket is moved away from the drain opening in the cooler. The drain opening is located on the cooler such as to promote its drainage. If this cooler is used, for example, for the lubricating oil circuit of an internal combustion engine, when the oil is changed, the cooler can be completely or at least largely emptied by means of the drain opening, so that the fresh oil is not immediately contaminated by residues of the used oil. In this way longer engine service life can be achieved, as well as longer intervals between oil changes, so that the reliability of operation of the internal combustion engine increases, and greater economy in the operation of the internal combustion engine is achieved.

During the operation of the cooler, the seal or gasket effectively prevents any bypassing of the cooler passages, which would reduce its cooling efficiency. Since the cooler has no filtering function, however, perfect sealing is not necessary, and a slight residual leakage may be technically acceptable. Therefore the gasket does not need to satisfy any stringent requirements. The gasket can be made from an elastomer, but it is also possible to create it by an appropriate geometrical configuration of the valve stem.

In accordance with another embodiment of the invention, the valve stem has an additional gasket which sealingly closes a drain opening in the housing. Thus the drain opening is likewise opened by the removal of the screw cover and can promote the drainage of the entire filter housing. At the same time the drain opening can also be used to carry out of the housing the liquid issuing from the cooler.

One particular preferred embodiment envisions a center tube provided in the cooler and the drain opening is provided in this central tube. The valve stem can then extend into this central tube and seal the drain opening there. If the cooler a plate type cooler, the center tube has additional advantages during manufacturing. It passes through the individual plates and is soldered to them in order to create spaces in the cooler for the liquid being cooled as well as for the cooling liquid.

The central tube as well as the valve stem must be arranged in the axis of rotation of the screw cover. This assures that the rotation of the screw cover will not cause any collision of the valve stem with parts in the interior of the filter housing. By rotating the screw cover, the necessary axial displacement of the valve stem is achieved, which results in the opening of the drain.

Another possibility is to provide the drain opening in the bottom plate of the cooler. In this case, however, the cooler must be inserted as a component into the housing, while at the same time an intermediate passage is formed which is constituted partly by the bottom plate of the cooler and partly by the wall of the housing. The drain opening of the cooler leads into this passage, so that opening it permits the liquid residue to be removed from the cooler. The intermediate passage must have a connection either to the outlet or to the drainage opening in the filter housing. With this arrangement an especially fast removal of the liquid from the cooler can be achieved.

In accordance with another embodiment of the invention, the valve stem is fastened to a support tube which accommodates the filter cartridge. The support tube must then be fastened in turn to the screw cover in order thereby to limit the axial play of the valve stem. The filter cartridge is fastened on this support tube. This is preferably accomplished by placing the filter cartridge with at least one end plate onto the support tube. The valve stem can be fastened on the support tube with an appropriate means, such as a catch or snap fastener or by adhesive bonding. The support tube and valve stem, however, can also be manufactured in one piece. The advantage of this arrangement consists in a material saving, since the valve stem does not have to be guided all the way to the screw cover. The support tube is a component which has to be provided anyway due to the design.

An additional advantageous embodiment is obtained by providing a coupling device between the filter cartridge and the cooler to join these two components sealingly together. The liquid can thus be conveyed from the clean side of the filter cartridge directly to an inlet in the cooler. Advantageously, this coupling device is designed so that the filter cartridge can be placed with its end plate in sealing engagement with the coupling device, e.g. with a tubular stub on the sealing device. In this way a seal is simultaneously assured, since the end plate yields elastically. The other end of the coupling device preferably is disposed on the top plate of the cooler, which simultaneously contains the inlet for the liquid to be cooled. In this manner the different filter cartridges can be fitted to the cooler by modifying only a single component. This has an advantageous influence on the cost of production of a series of filters.

A cooler according to the invention is suitable for cooperating with the liquid filter described above. This can be done either by installing it in the filter housing or by building it onto the latter. In the second mode of installation it is necessary to assure that the valve stem can reach from the cylindrical housing into the attached oil cooler. Also, it is necessary to assure that the liquid running out of the cooler can either be collected or can be fed to the liquid circuit. To be able to be built into the system according to the invention, the cooler requires the outlet opening already described.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
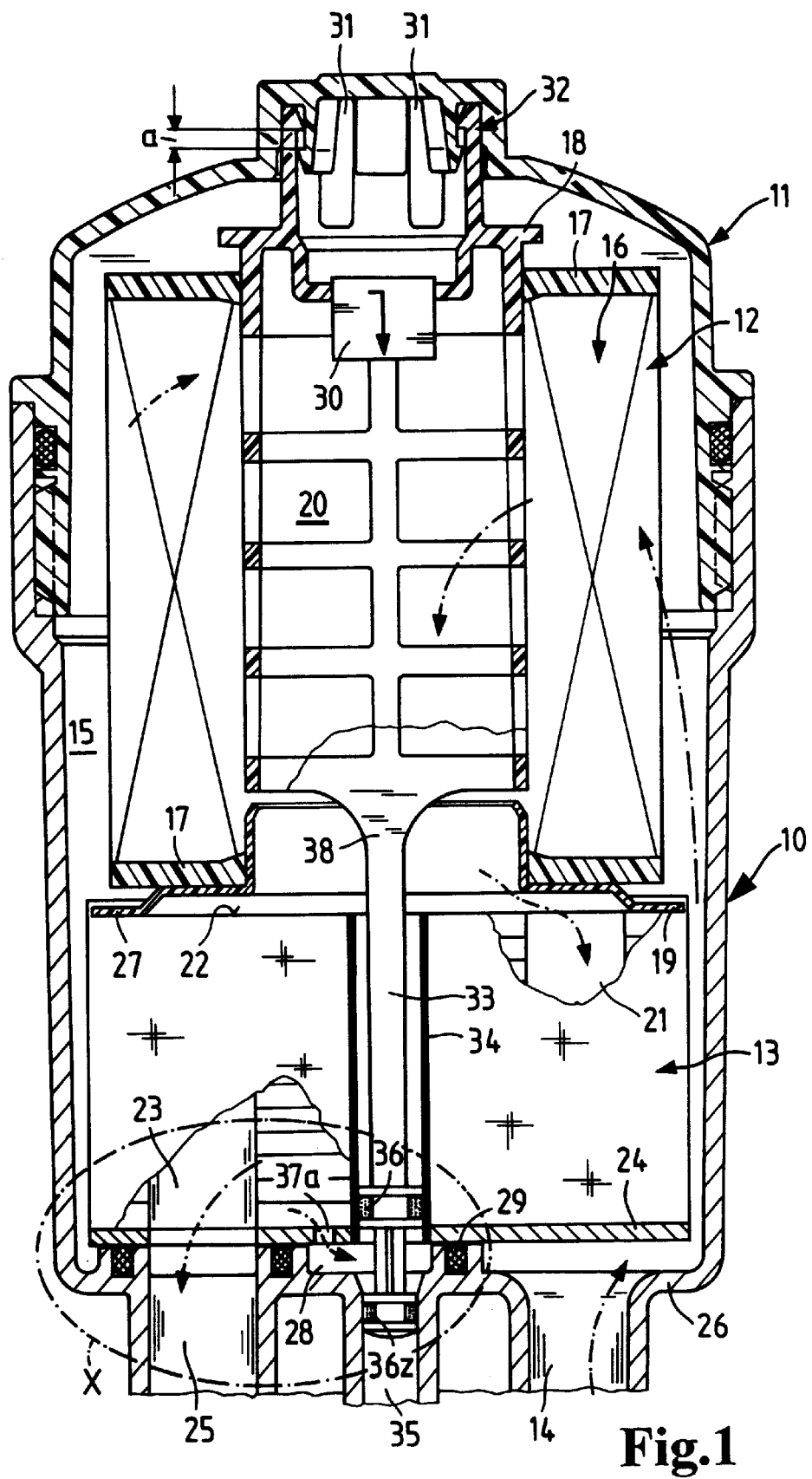
FIG. 1 shows a filter with a pot-like housing and a built-in oil cooler in longitudinal section.

The filter according to FIG. 1 comprises a casing with a cylindrical housing 10 and a threaded cover 11 which is screwed sealingly onto the housing. A filter cartridge 12 and a cooler 13 are disposed inside the housing 10 such that the oil that is to be filtered and cooled travels the course through the filter indicated by the arrows shown in FIG. 1.

The oil passes through a filter inlet 14 to a raw (i.e. unfiltered) liquid side 15 which is formed by the housing. From there it passes through a filter medium 16 which is mounted by end plates 17 sealingly on a support tube 18 and on a coupling device 19. After pasing through the filter medium the filtered liquid enters a clean (i.e., filtered) liquid side 20 in the interior of the filter cartridge 12. The filtered oil is conveyed through the coupling device 19 to an inlet 21 which is contained in a top plate 22 of the cooler 13. It flows through the cooler in a manner not specifically shown and thus reaches a cooler outlet 23 in the bottom plate 14 of cooler 13. The cooler outlet 23 communicates with a filter outlet 25 in the housing. The cooler furthermore has conventional connections, not shown, for the cooling water, and these connections can be joined in front of and in back of the plane of drawing to corresponding coolant connections in the base 26 of the housing 10. Their structural configuration can correspond to that of the filter outlet 25.

To assure the liquid circuit described in normal operation, the various components must be sealed relative to one another. The filter cartridge 12 is sealed by the end plates 17, which have inherent elasticity, over the support tube 18 and coupling devices 19. The coupling device 19 has a resilient margin 27 which rests against the top plate 22 of the oil cooler and thus creates the connection between the clean side 20 of the filter cartridge and the cooler inlet 21. The resilience or elasticity of the margin of the coupling device also provides the sealing action at this location. Alternatively, the coupling device 19 can also be made part of the oil cooler and be soldered to the cooler. This simultaneously solves the sealing problem. The outlet 25 and an intermediate passage 28 are sealed against the bottom plate 14 of cooler 13 by a molded gasket 29. This is necessary since the interior space formed by the housing is part of the raw side 15 of the filter.

An additional function of the filter is provided by the schematically represented bypass valve 30. If the pressure drop across the filter medium 16 increases to an excessive level, the bypass valve opens in order to assure a supply of lubricating oil to the internal combustion engine. The oil flows through openings 31 in a catch or snap fastener 32 which fastens the support tube 18 to the screw cover 11, and passes through the bypass valve 30 directly to the clean side 20 of the filter.

Due to its limited axial play a, the catch or snap fastener 32 assures that the valve stem 33, which is attached to or integrated with the support tube 18, is moved along with the threaded cover 11 when the cover is opened. The valve stem 33 is disposed in a central tube 34 in the oil cooler. From there it extends into a drain opening 35 in the base 26 of the housing. The valve stem 33 has O-rings 36 and 36z in the area of the central tube 34 and in the area of the drain opening 35, respectively, which bear against the walls around them and thus produce a seal. The intermediate passage 28 is completely separated from the liquid circuit and the openings communicating with the housing. The molded gasket 29 additionally contributes to this. As a result, during normal operation of the filter, no oil can pass through an outlet opening 37a which is contained in the bottom plate 24 of the cooler, since this opening leads into the sealed intermediate passage 28. Of course, the intermediate passage 28 will first fill with oil. Thereafter no further flow of oil through the outlet opening 37a is possible so long as the drain opening 35 remains sealed off by the valve stem 33 and seal 36z.

The valve stem 33 is located precisely in the axis of rotation 38 established by the thread of the screw cover 11, so that the valve stem, which is coupled to the screw cover 11 via the center tube 18, can be removed together with the screw cover 11 from the housing 10. To do this, the drain opening 35 is first uncovered so that the cooler 13 can empty through the outlet opening 37a. When the valve stem is withdrawn, the central tube 34 can additionally be used in order to drain the oil contained in the housing, which thereby reaches the drain opening 35.

Figure 2:
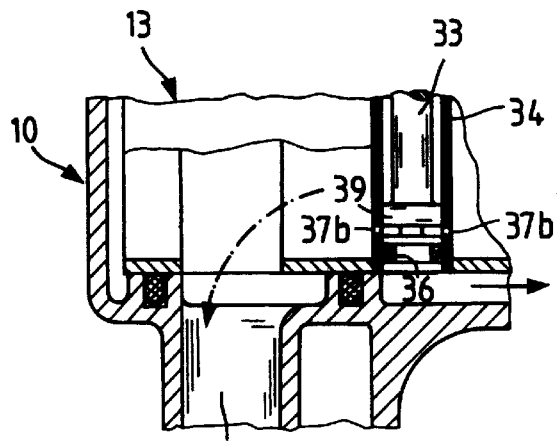
FIGS. 2 through 4 show variants of the detail X of FIG. 1.

Another variant embodiment for draining the filter is illustrated in FIG. 2. An outlet opening 37b is contained in the central tube 34 of the cooler 13, and is sealed from the rest of the housing by an O-ring 36 as well as a disk or washer 39. If the valve stem is retracted from the central bore by unscrewing the cover, not shown in this figure, the oil in the cooler can flow out through the outlet opening 37b, which is preferably in the lowermost trough of the oil cooler, not shown, into the housing interior.

Figure 3:
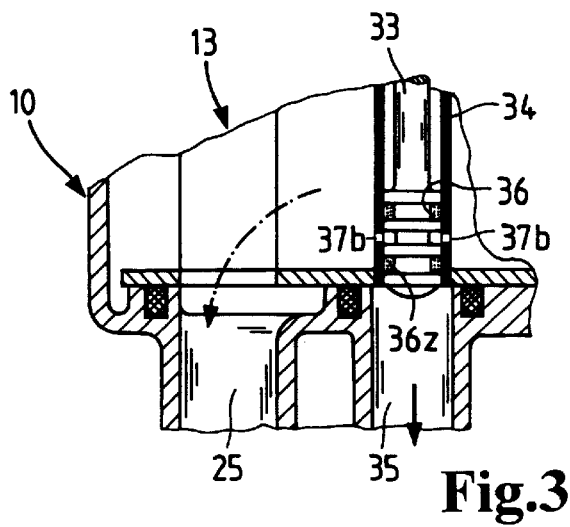

An additional variant of the cooler drainage is illustrated in FIG. 3. The outlet opening 37b is likewise contained in the central tube 34. The valve stem 33 carries a first O-ring 36 and an additional O-ring 36z. The outlet opening 37b is arranged between the two O-rings such that O-ring 36 provides a seal relative to the interior of the filter housing, and O-ring 36z provides a seal relative to the drain opening 35. When the valve stem 33 is lifted by unscrewing the cover—not shown—the oil can flow out of the oil cooler 13 through the drain opening 35.

Figure 4:
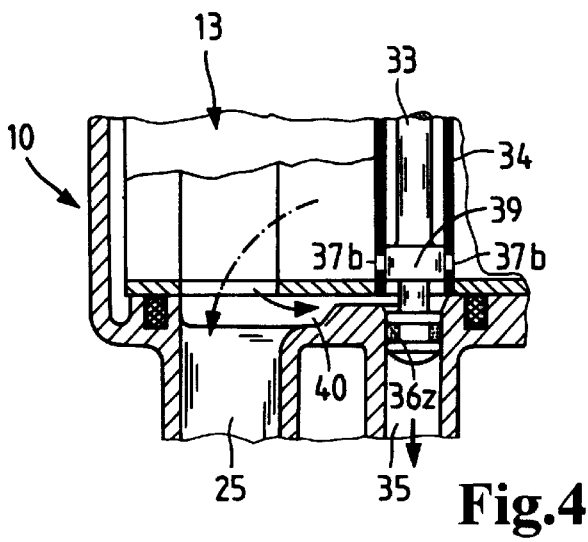

An additional variant embodiment for draining the oil from the filter housing is depicted is FIG. 4. In this variant, the outlet opening 37b again is provided in the central tube 34, and is closed by a disk or washer 39. In this embodiment, disk 39 completely covers the outlet opening 37b. The drain opening 35 is closed by an O-ring 36z at the end of the valve stem 33. In this variant the drain opening 35 can additionally be used in order to assure the drainage of the filter housing. For this purpose a supplemental passage 40 is provided which permits the entire filter housing to be drained through the path provided for the oil in the cooler, even when the cooler 13 is installed. In this manner the drainage speed can be increased, thereby facilitating the maintenance procedure.

Of course, it is also possible to provide a plurality of outlet openings 37a and b on the oil cooler. In this manner too the speed of the drainage of residual oil can be increased. In particular, it is possible to combine outlet openings 37b in the central tube with outlet openings 37a in the bottom plate of the cooler 13.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A liquid filter comprising a cylindrical housing having an upwardly oriented opening, relative to gravity, and a threaded cover screwed onto said housing to close said opening, said housing having a filter inlet for a liquid to be filtered, a filter outlet for filtered liquid, and a bottom drain opening through which liquid can drain out of the filter, a filter cartridge sealingly disposed in said housing between said inlet and outlet so that liquid from said inlet must pass through the filter cartridge to reach said filter outlet, a cooler disposed underneath said filter cartridge in said housing such that liquid which has passed through said filter cartridge can flow through said cooler to said filter outlet, said cooler having a cooler outlet opening communicating with said drain opening, a valve stem extending along the axis of rotation of said threaded cover, said valve stem having a limited range of axial play relative to the threaded cover, and at least one seal on said valve stem which blocks liquid from flowing through the cooler outlet opening to said drain opening, said cooler outlet opening being unblocked by unscrewing said threaded cover from said housing.

2. A liquid filter according to claim 1, wherein said valve stem carries two seals, one of which sealingly closes said drain opening in said cylindrical housing, and wherein said drain opening is opened by unscrewing said threaded cover from said housing.

3. A liquid filter according to claim 2, wherein said second seal comprises an O-ring on said valve stem.

4. A liquid filter according to claim 1, wherein a central tube is provided in said cooler, and said valve stem extends through said central tube, and wherein said outlet opening opens from said cooler into said central tube.

5. A liquid filter according to claim 1, wherein an intermediate passage is formed between said cooler and said housing; said intermediate passage leading to said drain opening, and said cooler outlet opening opens into said intermediate passage.

6. A liquid filter according to claim 1, wherein the filter cartridge is disposed on a support tube in said housing, and said valve stem is attached to said threaded cover via the support tube, and wherein the axial play of the valve stem is limited by the support tube.

7. A liquid filter according to claim 1, wherein a coupling member is provided between the filter cartridge and the cooler, said coupling device being attached to the cooler and sealingly engaging the filter cartridge such that a connection is formed between the interior of the filter cartridge and a liquid inlet opening into said cooler.

8. A liquid filter according to claim 1, wherein said filter is connected to an internal combustion engine for filtering lubricating oil of said engine.

* * * * *